Jan. 13, 1970    J. S. FOGEL    3,489,738
PROCESS FOR PREPARING ANTISTATIC FREE-FLOWING POLYMER POWDERS
Filed Nov. 22, 1967
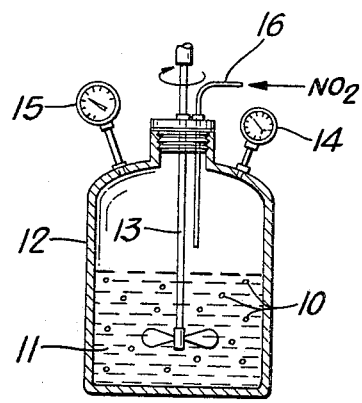
INVENTOR.
JOSEPH S. FOGEL
BY
his Agent _United States Patent Office_

3,489,738
Patented Jan. 13, 1970

3,489,738
PROCESS FOR PREPARING ANTISTATIC FREE-FLOWING POLYMER POWDERS
Joseph S. Fogel, Export, Pa., assignor to Koppers Company, Inc., a corporation of Delaware
Filed Nov. 22, 1967, Ser. No. 685,123
Int. Cl. C08f 3/04, 3/08, 15/04
U.S. Cl. 260—88.2                                    6 Claims

ABSTRACT OF THE DISCLOSURE

Polymer powders, such as polyethylene powder, are rendered antistatic and free-flowing by treatment with nitric oxide at an elevated temperature. Polymer powders so treated are free-flowing and especially well-suited for use in rotational molding applications.

BACKGROUND OF THE INVENTION

Olefins, as is well known, will polymerize to relatively high molecular weight, solid, polymeric materials at the relatively low pressure of less than one-hundred atmospheres and temperatures of less than about 400° C. in the presence of an organo-metallic compound and a compound of a metal of sub-groups IV-B, V-B, VI-B of the Periodic Table. A process for polymerizing olefins to such polymers is shown, for example, in Hooker Patent No. 3,126,365. The product from the polymerization reactor is recovered as a fine powder called "reactor powder."

The polymer product is highly susceptible to the accumulation of an electrostatic charge. This accumulated charge presents such problems as disagreeable electric shock accumulation of dust on molds used in shaping articles of such resins, and may lead to many other objectionable and even dangerous consequences, such as ignition of inflammable solvents. The powder generally must be treated in some manner to eliminate that undesirable static charge. Heretofore, methods of elimination of the charge have been to add antistatic agents such as alkaryl polyglycol ethers, polyglycol monoalkyl ethers, or fatty-acid-derived lubricants to the powder.

Oftentimes, especially in the case of polyethylene, it is desired to use the polymer in a rotational molding application. The polymer powder is charged to a mold that has highly conductive walls and is designed to rotate about several axes in a heated atmosphere. The rotation causes the powder to flow to the heated mold walls where it melts and forms a skin on the inside surface of the mold in the shape of the mold cavity. Any electrostatic charge is highly detrimental because an electrostatic charge on the powder will impart to the powder poor flow properties and a tendency to cake and, consequently, will produce a rotationally molded article having surface voids and a skin of non-uniform thickness. These defects, of course, cause weak points in the molded article.

This invention provides a method of rendering polyolefin powders, especially polyethylene powder, non-caking and antistatic and especially well-suited for rotational molding.

SUMMARY OF THE INVENTION

According to the invention, polyolefin powders such as polyethylene powder, which are normally susceptible to the accumulation of an electrostatic charge, are contacted with nitric oxide in an inert atmosphere at a temperature below the softening point of the polyolefin. Surprisingly, the powder which results has a non-caking and antistatic nature. Polyethylene powders made according to the invention may be used directly in rotational molding operations without further modification.

DESCRIPTION OF THE DRAWING

The drawing illustrates a suitable apparatus for carrying out the process of the invention when an inert solvent is employed.

DETAILED DESCRIPTION

Referring to the drawing, the polymer particles 10 (size greatly exaggerated for the purpose of illustration) are suspended in an inert liquid 11 in a suitable vessel 12 equipped with mechanical agitator 13, temperature indicator 14, and pressure indicator 15. Nitric oxide is introduced to the vessel through conduit 16 while the particles 10 are maintained in suspension in liquid 11 by mechanical agitator 13. The polymer particles are contacted with the nitric oxide at a temperature of from about 30° C. to a temperature below the softening point of the polymer. Higher temperatures generally are preferred since at higher temperatures the treatment is more effective and less time is required.

It has been found that the process works best when the polymer powder is suspended in a liquid which is a non-solvent for the polymer being treated and which is inert with respect to nitric oxide. In the case of polyethylene, hexane or chloroform is preferred as a liquid; but other liquid suspending agents which do not react with nitric oxide and which are non-solvents for the polymer may also be used. When the liquid which is used as the suspending agent is a solvent for the polymer at an elevated temperature, the temperature at which the nitric oxide contact takes place must be below the solution temperature of the polymer in that liquid. In all cases, the treatment should take place in the absence of water to avoid a formation of nitric acid, and also in the absence of oxygen.

The pressure at which the treatment is carried out is not critical, and pressures from about atmospheric to about 100 p.s.i.g. or higher are suitable. The length of time of the contact of polymer with the nitric oxide varies with the treating condition. In most cases, times of about one hour are sufficient, and it has been found that times longer than about 5 hours are inconsequential in further improving the anti-static properties of the polymer being treated.

This invention is especially effective with polyethylene and copolymers thereof, e.g. ethylene/propylene, ethylene/butene, ethylene/pentene copolymers, and the like. The process of the invention is useful in rendering antistatic and free-flowing polymeric powders of varying particle size and may be applied with success to powders having particle sizes varying from about 10–500 microns (ca. 400–25 mesh in Tyler Standard Screen Scale Sieve Series, Handbook of Chemistry and Physics, 42nd ed., p. 3365 (1961)).

The free-flowing characteristic of a powder made in accordance with the invention can easily be seen by placing some treated powder in a glass jar and placing the jar, for example, on a tumbling mill or ball mill and comparing its flow characteristics and caking characteristics with a powder which has not been made in accordance with the invention. Powders treated according to the invention are remarkably superior in anti-caking properties to an untreated powder.

Likewise, the fact that powders made according to the invention are substantially more antistatic than untreated powders can be shown by a simple test. A comb is drawn through human hair, and the attraction of treated and untreated powders to the comb is noted. In every case, treated powders show little or no attraction to the comb; and, in many cases, are completely indifferent to the comb's presence. On the other hand, untreated particles react intensely to the presence of the comb. This invention will be further illustrated by, but is not intended to be limited to, reference to the following examples.

EXAMPLE I

To a vessel such as is shown in the drawing was charged 150 milliliters anhydrous chloroform and 75 grams polyethylene powder (sold under the tradmark Super Dylan). The mixture was stirred and heated to 50° C., and the vessel was pressured to 40 p.s.i.g. with nitric oxide in the absence of oxygen or water. The mixture was held at 50° C. and 40 p.s.i.g. for 2 hours. Then the excess nitric oxide was flushed out with $N_2$. The slurry was filtered and the polymer on the filter was washed with 100 milliliters of chloroform, then air dried, and subsequently passed through a No. 30 mesh sieve. The treated powder showed no tendency to cake when placed in a jar on a tumbling mill and flowed freely without caking. When an untreated sample of the same powder was placed in another jar and placed on the tumbling mill, it was not free-flowing and caked considerably. The powder of this invention was not susceptible to the pick up of an electrostatic charge when tested by the comb method described hereinabove, whereas, the other sample of polymer powder reacted visibly to the charged comb.

Polyethylene powder was treated in the manner of Example I under the various conditions listed in the following table. In all cases, the anti-static and free-flowing characteristics of the powders were markedly improved over untreated powder.

TABLE

| Liquid suspending agent | Run No. | T., ° C. | Pressure, p.s.i.g. | Time, hrs. |
|---|---|---|---|---|
| Chloroform | 1 | 75 | 50 | 1.5 |
| Do | 2 | 80 | 50 | 1.0 |
| Do | 3 | 20 | 50 | 4.0 |
| Do | 4 | 20 | Atm. | 5.0 |
| Hexane | 5 | 20 | 50 | 4.0 |
| Do | 6 | 50 | 75 | 2.5 |
| Do | 7 | 80 | 50 | 2.0 |

EXAMPLE II

The procedure of Example I was repeated with the exception that 75 grams of an ethylene/butene-1 copolymer powder was used instead of a polyethylene and the process was carried out at a temperature of 80° C. for 2 hours under a $NO_2$ pressure of 50 p.s.i.g. The treated powder was free-flowing, non-caking, and antistatic.

EXAMPLE III

The method of Example I was repeated with the exception that 75 grams of polypropylene powder was used instead of polyethylene. The resulting product had antistatic and free-flowing characteristics similar to the powder of Example I.

EXAMPLE IV

A sample of polyethylene powder was treated by contact with nitric oxide at atmospheric pressure in the adsence of a liquid suspending agent at 100° C. for 5 hours. The flask containing the powder was rotated during the treatment to enhance contact between the powder and nitric oxide. The resulting powder after passing through a No. 30 mesh sieve had considerably less tendency to cake than before treatment. However, it did cake somewhat more than powders treated in the presence of a liquid suspending agent.

The foregoing describes the invention herein of rendering a polymer powder less susceptible to the accumulation of an electrostatic charge and thereby enhancing its free-flowing characteristics. The invention is not intended to be limited to the modes shown herein, but other equivalent processes, obvious to those skilled in the art, are also within the scope of this invention.

What is claimed is:
1. A process for producing an antistatic polyolefin powder which comprises contacting the polyolefin powder with nitric oxide in the absence of water at a temperature of about 20° C. to a temperature below the softening point of said polyolefin.
2. The process of claim 1 wherein said contacting is at super atmospheric pressure.
3. The process of claim 1 wherein said powder is slurried in a liquid which is a non-solvent for said powder and is inert to nitric oxide.
4. The process of claim 1 wherein said polyolefin powder is selected from the group consisting of homopolymers of the monomers ethylene, propylene, butene-1, and copolymers of mixtures of the said monomers.
5. A polyolefin powder which has been contacted with nitric oxide in the absence of water at a temperature of from about 20° C. to a temperature below the softening point of said polyethylene at a pressure from atmospheric to superatmospheric for a time sufficient to impart to the powder antistatic and free-flowing properties.
6. The process of claim 1 wherein the particle size of said powder is from about 10–500 microns.

References Cited
UNITED STATES PATENTS

| 2,858,237 | 10/1958 | Walles et al. | 117—118 |
| 3,205,206 | 9/1965 | Marcantonio | 260—88.2 |

JAMES A. SEIDLECK, Primary Examiner

RICHARD A. GAITHER, Assistant Examiner

U.S. Cl. X.R.

260—93.7, 94.9